(12) United States Patent
Hong et al.

(10) Patent No.: US 6,563,772 B2
(45) Date of Patent: May 13, 2003

(54) METHOD OF TRACKING CONTROL FOR OPTICAL DISC RECORDER AND REPRODUCER

(75) Inventors: Seong Pyo Hong, Sung Nam; Kyung Soo Kim, Kwachun, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/767,525

(22) Filed: Jan. 23, 2001

(65) Prior Publication Data

US 2001/0009535 A1 Jul. 26, 2001

(30) Foreign Application Priority Data

Jan. 26, 2000 (KR) .............................................. 00-3760

(51) Int. Cl.[7] .................................................. G11B 7/00
(52) U.S. Cl. .............................. 369/44.26; 369/44.25; 369/44.29; 369/44.32
(58) Field of Search .......................... 369/44.25, 44.26, 369/44.28, 44.29, 44.32, 44.34, 44.35, 47.1, 53.1, 53.2, 53.41, 59.1, 59.17, 124.1

(56) References Cited

U.S. PATENT DOCUMENTS

| 5,138,594 | A | * | 8/1992 | Fennema et al. | ........ 369/44.29 |
| 5,247,501 | A | * | 9/1993 | Hashimoto et al. | ...... 369/44.11 |
| 5,760,991 | A | * | 6/1998 | Senba | ..................... 360/79.06 |
| 6,091,678 | A | * | 7/2000 | Fushimi et al. | .......... 369/44.26 |

* cited by examiner

Primary Examiner—Muhammad Edun
(74) Attorney, Agent, or Firm—Lee & Hong

(57) ABSTRACT

Disclosed is a method of tracking control for an optical disc recorder and reproducer, which includes the steps of detecting a land/groove switching position, storing tracking error signals for a predetermined time if the land/groove switching position is detected, obtaining a mean value of the stored tracking error signals, and judging whether the mean value is larger than a predetermined permissible tracking level, and if it is judged that the mean value is larger than the predetermined tracking level, determining a direction of a track center, correcting the track center, and compensating for a DC offset.

8 Claims, 5 Drawing Sheets

METHOD OF TRACKING CONTROL FOR OPTICAL DISC RECORDER AND REPRODUCER

BACKGROUND OF THE INVENTION

1. Field of the Invention

The present invention relates to a method of tracking control for an optical disc recorder and reproducer which discriminates a track deviation of an optical head and controls the track deviation in accordance with a result of discrimination when tracking an optical disc having a land/groove track structure.

2. Description of the Related Art

Recently, the demand for a large storage capacity has been increased in an optical write/read field or an optomagnetic write/read field. Accordingly, in an optical recording medium such as a digital versatile disc-random access memory (DVD-RAM), there has been proposed a so-called land/groove (L/G) write system for writing information both on a land track and a groove track of the DVD-RAM.

FIG. 1 is a block diagram of a conventional tracking control apparatus for a land/groove write type optical disc recorder and reproducer.

Referring to FIG. 1, the conventional tracking control apparatus includes an optical detector 11 for detecting a quantity of light of a laser signal reflected from an optical disc, a radio frequency (RF) amplifier 12 for amplifying a signal detected from the optical detector 11 as an RF signal, a first adder 13 for producing a tracking error signal TE by adding an offset value δ to an output signal of the RF amplifier 12, a digital signal processing section 14 for switching a polarity of the tracking error signal TE and outputting a control signal in accordance with a switched signal during switchover of a land/groove of the tracking error signal TE, an actuator 15 for finely moving an optical pickup in accordance with the control signal outputted from the digital signal processing section 14, and a second adder 16 for adding an output of the actuator 15 and a disc eccentricity value ε, and feeding a position value x of an object lens of the optical pickup head back to a subtracter 17 to follow a desired track Xr.

The operation of the conventional tracking control apparatus for an optical disc recorder and reproducer as constructed above will be explained with reference to the accompanying drawings.

First, the eccentricity value ε of the optical disc and the output of the actuator 12 are added by the second adder 16, and then feedback to the subtracter 17. This feedback signal x is compared with a desired tracking target value Xr. At this time, the light reflected from the optical disc is detected as an electric signal by the optical detector 11, and the detected electric signal is amplified as RF signal by the RF amplifier 12. This amplified RF signal is added to the offset value δ to produce the tracking error TE signal.

Here, the offset δ of the optical disc is produced due to the quantity of light among signals A, B, C, and D formed on the optical detector 11 of the optical pickup, an offset that may be produced from an IC (i.e., master or sleeve) being used, and a degraded track following of a sled servo for moving the optical pickup from an internal periphery to an external periphery of the optical disc. The tracking error signal TE is offset from a track center Tc as much as the offset value δ.

FIGS. 2a and 2b are waveform diagrams of the tracking error signal in the land/groove , tracks with respect to the offset δ. In case of δ=0 as shown in FIG. 2a, the tracking error signal TE follows the track center Tc with TEG(x) and TEL(x). In case of δ≠0, As shown in FIG. 2b, the tracking error signal TE follows the track center Tc with TEG(x)+δ and TEL(x)+δ, being apart from the track center Tc as much as the offset value δ.

The digital signal processing section 14, which receives the tracking error signal TE as described above, switches the sign (i.e., "+" or "−") of the tracking error signal TE in accordance with the land/groove (L/G) signal of the track that the optical head 1 follows, and outputs the control signal u to the actuator 15 in accordance with a switched track error em.

Here, the digital processing section 14 is composed of a sign switching section 14a and a tracking controller 14b. The sign switching section 14a outputs the track error em by switching the sign of the tracking error signal TE by the L/G signal inputted according as the track that the optical head 1 follows is the land or the groove. The tracking controller 14b judges the deviation and the tilt of the optical disc by the switched track error em, and outputs the control signal u to the actuator 15.

The actuator 15 moves in a direction that the offset is removed according to the control signal u. At this time, the sled servo extracts a DC offset component of the tracking servo as a driving voltage of the actuator 15, and drives a sled motor to move the pickup. The second adder 16 feeds the position value x of the object lens of the optical head 1 back to the subtracter 17 to follow the desired track Xr by adding the output of the actuator 15 and the disc eccentric signal ε.

Meanwhile, as shown in FIGS. 2a and 2b, since the physical movement of the optical head in a radial direction r and the sign of the tracking error signal TE detected in a track direction t have a phase difference of 180°, respectively, in the land/groove, the sign switching section 14a switches the sign of the tracking error signal based on either of the land and groove according as the land/groove track is accessed. Also, the sign of the DC offset δ is changed oppositely simultaneously with the switchover of the tracking error signal TE, and thus the tracking error signals having the different tracking deviation are inputted to the tracking controller 14b.

Specifically, in the system, if the offset value added to the tracking error signal TE is δ offset=0, the track error em in the radial direction r of the optical head 1 satisfies the following equation.

$$TE_G = -TE_L \quad \text{[Equation 1]}$$

Here, $TE_G$ is the tracking error signal on the groove track, and $TE_L$ is the tracking error signal on the land track.

Also, in the system, if the offset value is not 0 (i.e., δ offset≠0), the track error em on the groove with respect to the movement of the optical head 1 in the radial direction satisfies the following equation.

$$em = TE = TE_G + \delta \text{ offset} \quad \text{[Equation 2]}$$

Meanwhile, in case of following the land of the track, the track error em is obtained by the following equation.

$$em = -TE = -(TE_{GL} + \delta \text{ offset}) = TE_G - \delta \text{ offset} \quad \text{[Equation 3]}$$

The tracking controller 14b receives the track errors obtained from the equations 2 and 3, and drives the actuator 15. At this time, since the offset δ exists though the tracking controller 14b is ideally designed and the condition that a standby state error is zero ("0"), the object lens is actually offset from and follows the track center in the standby state.

The land/groove switching state in a system where the offset is not 0 will be explained with reference to FIGS. 3a, 3b, and 3c. FIG. 3a is a view illustrating the variation of the tracking error signal TE when the object lens crosses in the radial direction during the land/groove switching operation, FIG. 3b is a view illustrating the time t and the movement of the object lens on the track, and FIG. 3c is a view illustrating the track error level for the time t.

In case that the offset ($\delta$, ①) exists as shown in FIGS. 3a and 3b, the object lens in the standby state is actually offset (⑥) from and follows the track center. If the offset value is not completely removed, the track error em having twice the offset ($2\delta$, ②) is inputted to the tracking controller 14b during the switchover at the next land/groove switching time point.

Then, the tracking controller 14b outputs the control signal u to the actuator 15 to move the object lens in the directions (②,④) that the track error is removed, and the actuator 15 moves the optical pickup. At this time, the object lens on the land/groove track moves in the directions (⑦, ⑧) opposite to the track center as much as the offset $\delta$ (FIG. 3b), and the shaking (⑨) of the object lens of the optical pickup occurs due to the transition during the switchover on the land/groove tracks (FIG. 3c).

Specifically, if the offset exists in the tracking error signal TE inputted to the tracking controller 14b of the digital signal processing section 14, the track error em corresponding to $2\delta$ abruptly occurs during the switchover of the land/groove tracks, and this causes the transition phenomenon (⑨).

Meanwhile, if the tracking error signal TE, which crosses the track in the system where the offset exists (i.e., $\delta \neq 0$), is asymmetric, the track error em corresponding to $2\delta$ occurs during the land/groove switchover (FIGS. 4a and 4c), and thus the shaking of the object lens due to the transition occurs (FIG. 4b).

However, according to the conventional apparatus, since the track following position is changed (i.e., ①→②) centering around the track center Tc when the track is switched from the land to the groove and vice versa, an instantaneous transition response occurs just after the switchover, and the shaking of the object lens (⑦and ⑧ in FIG. 3b) also occurs due to the transition phenomenon during the land/grove switchover.

Also, since the twice the offset value exists during the next land/groove switchover if the offset value is not completely removed, the track error corresponding to the offset value occurs. If this offset value is not removed, it exerts a bad effect on the tracking servo system.

SUMMARY OF THE INVENTION

Therefore, an object of the invention is to solve the problems involved in the related art, and to provide a method of tracking control for an optical disc recorder and reproducer which can prevent the track deviation by discriminating existence/nonexistence of the track deviation from the transition response that appears during the land/groove switchover, and optionally or automatically controlling the offset so that the transition response disappears.

In order to achieve the above object, there is provided a method of tracking control for an optical disc recorder and reproducer, comprising the steps of detecting a land/groove switching position of an optical disc; storing tracking error values for a predetermined time if the land/groove switching position is detected; and obtaining a mean value of the stored tracking error values for a predetermined number of times, judging whether the mean value is larger than a predetermined permissible tracking level, and if it is judged that the mean value is larger than the predetermined permissible tracking level, determining a direction of a track center, correcting the track center, and compensating for a DC offset.

Here, the mean value of the tracking error values is obtained by measuring the tracking error values at least once.

Also, the tracking error values are adaptively detected at the land/groove switching position even if a track servo is in a normal operation state to compensate for the DC offset.

BRIEF DESCRIPTION OF THE DRAWINGS

The above object, and other features and advantages of the present invention will become more apparent after a reading of the following detailed description when taken in conjunction with the drawings, in which.

DETAILED DESCRIPTION OF THE PREFERRED EMBODIMENT

Hereinafter, the present invention will be described with respect to the preferred embodiment illustrated in the annexed drawings.

Figure 5:
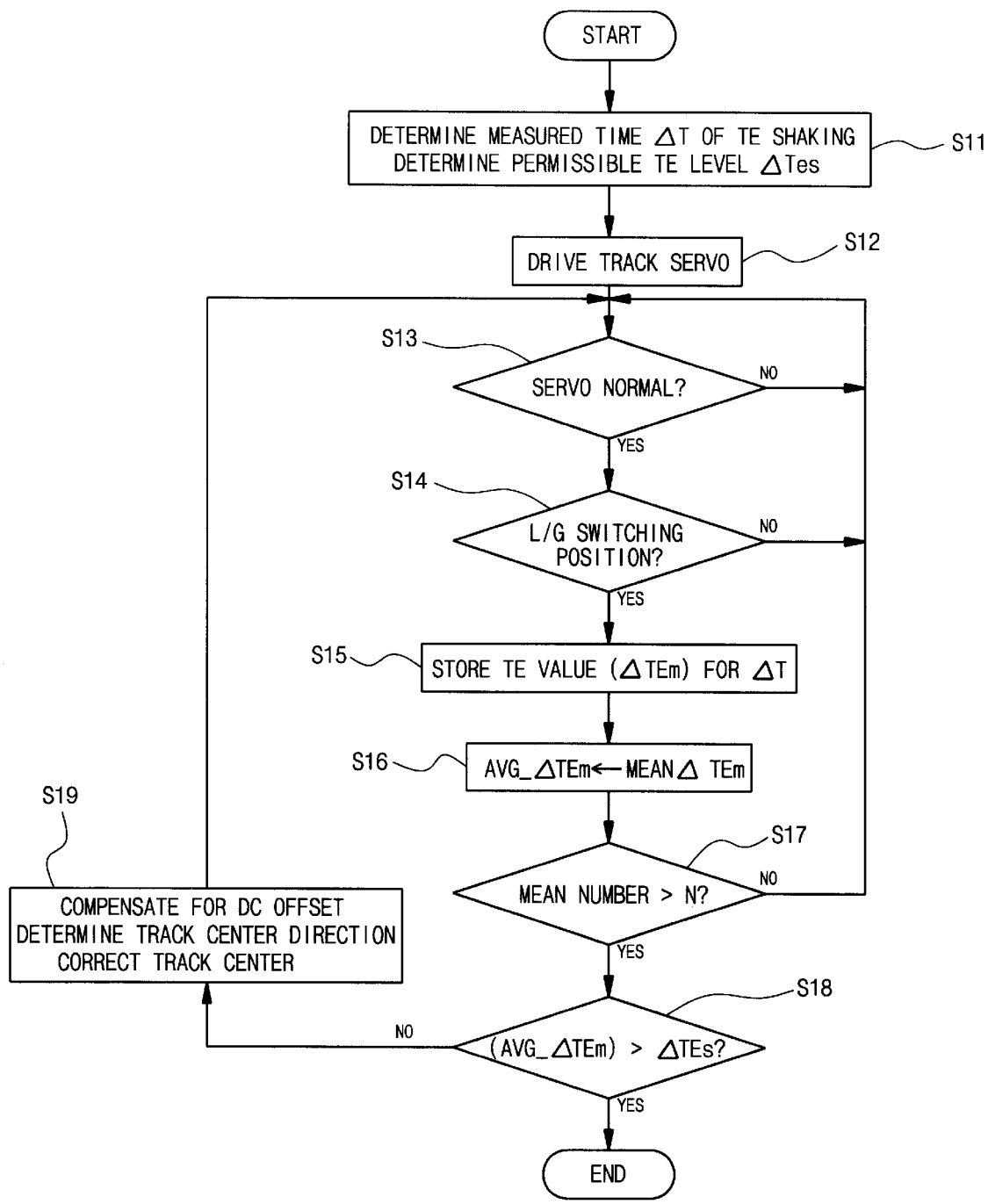
FIG. 5 is a flowchart illustrating a method of tracking control for an optical disc recorder and reproducer according to the present invention.

FIG. 5 is a flowchart illustrating a method tracking control for an optical disc recorder and reproducer according to the present invention.

Referring to FIG. 5, in order to remove the offset produced when the tracking is performed, a shaking measurement time $\Delta T$ and a permissible tracking error level $\Delta$ TEs are determined (step S11), and a tracking servo is driven (step S12). Then, it is checked whether the tracking servo is in a normal operating state (step S13).

Figure 1:
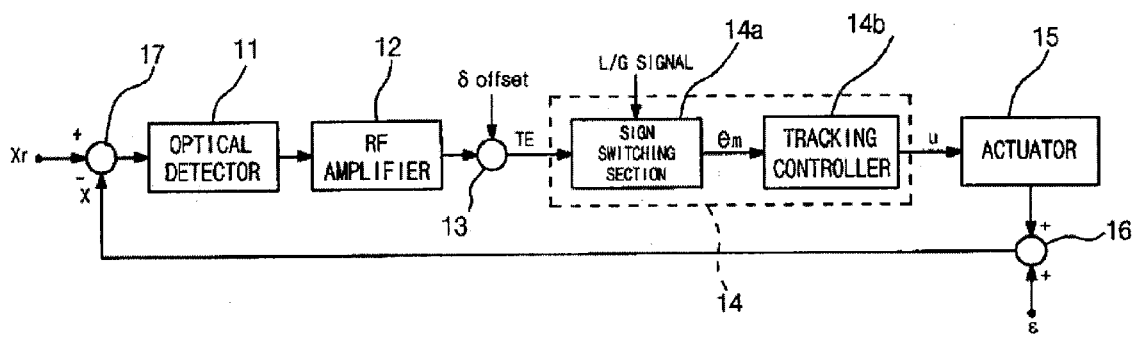
FIG. 1 is a block diagram of the conventional tracking control apparatus for an optical disc recorder and reproducer.
Figure 2A:
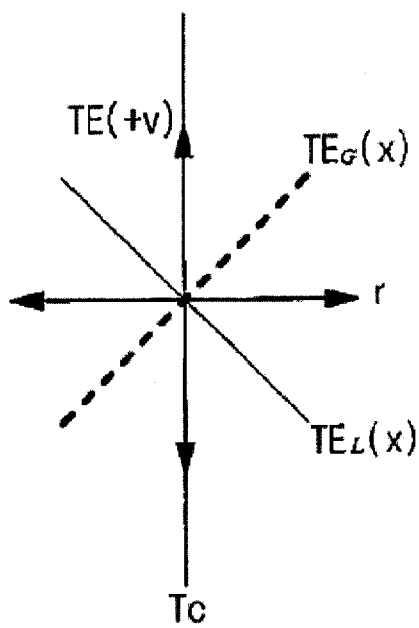
FIG. 2a is a view illustrating a track error state in land/groove tracks with respect to an offset value of zero.
Figure 2B:
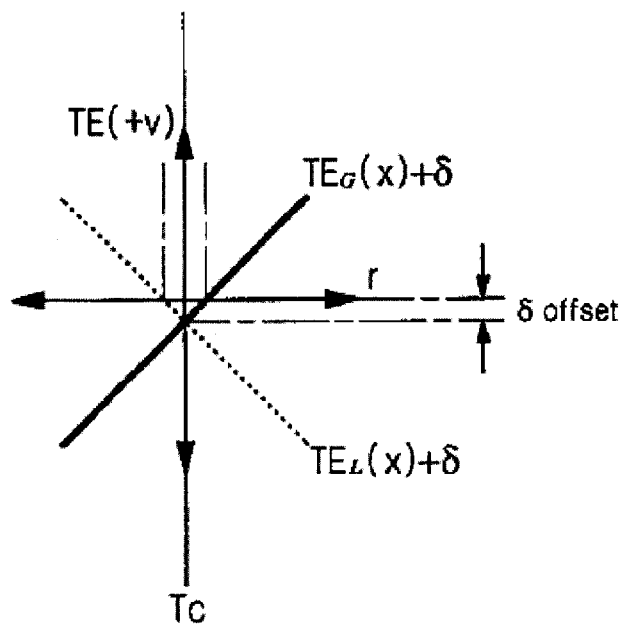
FIG. 2b is a view illustrating a track error state in land/groove tracks with respect to an offset value that is not zero.

If the tracking servo is in the normal operating state, the tracking controller (14b in FIG. 1) detects a land/groove switching position of the track by the track error inputted from the optical head (step S14). If the land/groove switching position is detected, track error levels $\Delta$ TEm are respectively stored for a predetermined time just after the switching operation (step S15). Then, the mean value AVG_$\Delta$ TEm of the stored track error levels $\Delta$ TEm is obtained (step S16).

The mean value AVG_$\Delta$ TEm of the track error levels $\Delta$ TEm is detected by repeating the above process for a predetermined time just after the switching operation of the land/groove tracks (step S17).

Then, the absolute value of the mean value AVG_Δ TEm of the track errors em detected at step S17 is compared with the predetermined permissible track error level Δ TEs (step S18). If the absolute value is larger than the permissible track error level as a result of comparison, the DC offset δ is corrected, the direction of the track center is accurately determined, and the track center is compensated for (step S19).

Specifically, if the offset δ exists, the track following position is necessarily changed centering around the track center when the track is switched from the land to the groove and vice versa, and thus an instantaneous transition response appears just after the track switching operation.

Figure 3:
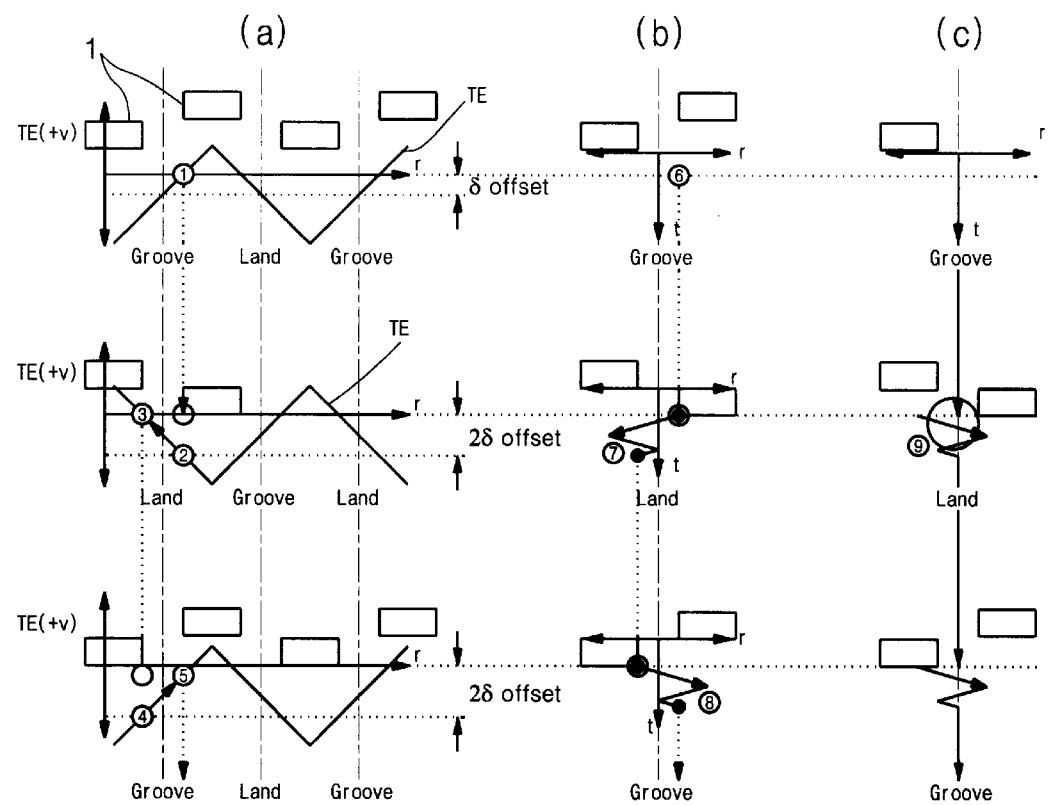
FIGS. 3a to 3c are waveform diagrams illustrating land/groove switching states in a system where the offset value is not zero according to the conventional tracking control method.

The track deviation is discriminated from such a transition response, and then prevented by optionally or automatically controlling the offset so that the transition response disappears. That is, the offset is eliminated by offsetting (i.e., ②→③ and ④→⑤ in FIG. 3a) for a corresponding amount the target of the tracking servo in the direction opposite to the switched track error center.

Figure 4:
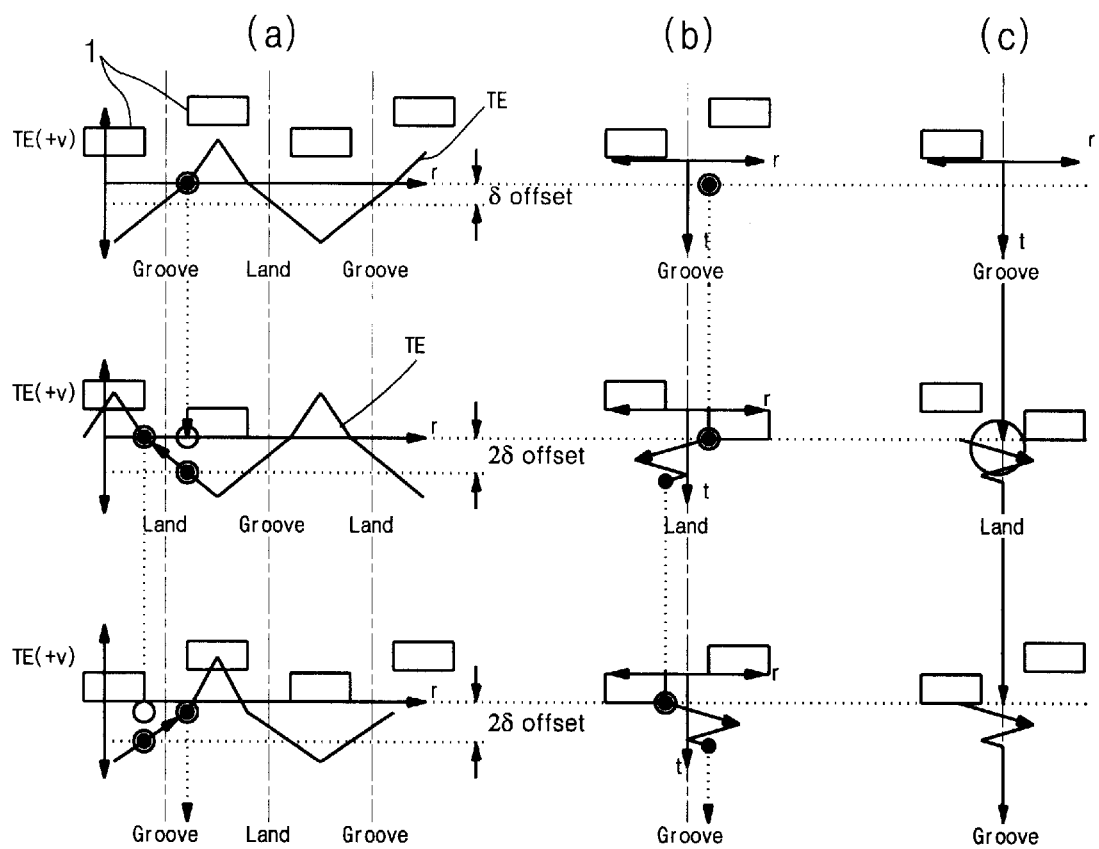
FIGS. 4a to 4c are waveform diagrams illustrating land/groove switching states in case that the tracking error signal is asymmetrical in a system where the offset value is not zero according to the conventional tracking control method.

Also, the offset is removed and the shaking amount of the tracking error is compensated for by detecting the amount of deviation from the track center and the direction thereof using the shaking amount of the track error (FIGS. 3c and 4c) and the shaking amount of the tracking controller output u when the transition response is produced.

Even when the center of the peak-to-peak value of the track error does not correspond to the actual track center (i.e., the tracking error signal is asymmetrical), it is possible to discriminate and control the track deviation from the transition characteristic that appears at the land/groove switching time point in the same manner as described above.

The offset compensation in the above-described tracking control method can be applied at an initial state of the system, and the offset-compensated tracking can be performed by adaptively applying it even during the normal operation of the system as well.

As described above, according to the method tracking control for an optical disc recorder and reproducer according to the present invention, the unstable factor of the tracking servo due to the shaking of the tracking error during the L/G switching operation can be solved by accurately detecting the actual track center and performing the tracking control according to a result of detection. Also, the track servo to cope with the track following of the sled tracking servo due to variation of the sled load can be maintained by adaptively compensating for the offset even during the normal operation of the servo.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of tracking control for an optical disc recorder and reproducer, comprising the steps of:

detecting a land/groove switching position;

storing tracking error signals for a predetermined time if the land/groove switching position is detected;

obtaining a mean value of the stored tracking error signals, and judging whether the mean value is larger than a predetermined permissible tracking level; and if it is judged that the mean value is larger than the predetermined tracking level, determining a direction of a track center, correcting the track center, and compensating for a DC offset.

2. The method as claimed in claim 1, further comprising the step of judging whether the mean value is larger than the permissible tracking level by measuring the tracking error signals at least once.

3. The method as claimed in claim 1, wherein the tracking error signals are adaptively detected at the land/groove switching position even if a track servo is in a normal operation state to compensate for the DC offset.

4. The method as claimed in claim 1, wherein if a center of a peak-to-peak value of the track error is not the actual track center, a tracking deviation is discriminated from a transition characteristic produced at a land/groove switching time point to adjust the tracking deviation.

5. The method as claimed in claim 1, wherein the stored tracking error signal is a shaking amount of the tracking error or a shaking amount of an output signal for a track following.

6. The method as claimed in claim 1, wherein the DC offset compensation value is a track error value of the track center produced from the actual track center and a track controller whose standby state error is zero during a land/groove to switching operation.

7. The method as claimed in claim 1, wherein the DC offset compensation value is a track error value that an object lens follows during a land/groove switching operation in a system where an offset value from the actual track center is not zero.

8. The method as claimed in claim 1, wherein in order to compensate for a direction of the track center, an object lens at a land/groove switching time point performs a track following in an opposite direction to the track center as much as an offset amount for which the object lens is offset from the actual track center.

* * * * *